(12) United States Patent
Braband

(10) Patent No.: US 12,528,525 B2
(45) Date of Patent: Jan. 20, 2026

(54) METHOD FOR MONITORING A DANGER AREA AND MONITORING DEVICE

(71) Applicant: Siemens Mobility GmbH, Munich (DE)

(72) Inventor: Jens Braband, Braunschweig (DE)

(73) Assignee: Siemens Mobility GmbH, Munich (DE)

( * ) Notice: Subject to any disclaimer, the term of this patent is extended or adjusted under 35 U.S.C. 154(b) by 361 days.

(21) Appl. No.: 18/005,702

(22) PCT Filed: Jun. 21, 2021

(86) PCT No.: PCT/EP2021/066724
§ 371 (c)(1),
(2) Date: Jan. 17, 2023

(87) PCT Pub. No.: WO2022/012861
PCT Pub. Date: Jan. 20, 2022

(65) Prior Publication Data
US 2023/0278604 A1 Sep. 7, 2023

(30) Foreign Application Priority Data
Jul. 17, 2020 (DE) .................... 10 2020 208 955.8

(51) Int. Cl.
*B61L 23/04* (2006.01)
*B61L 27/70* (2022.01)
*G01V 3/12* (2006.01)

(52) U.S. Cl.
CPC ............ *B61L 23/041* (2013.01); *B61L 27/70* (2022.01); *G01V 3/12* (2013.01)

(58) Field of Classification Search
CPC .......... B61L 23/041; B61L 27/70; G01V 3/12
(Continued)

(56) References Cited

U.S. PATENT DOCUMENTS 6,259,396 B1 * 7/2001 Pham .................. G01S 13/9027
342/191
7,868,760 B2 * 1/2011 Smith ................ G08B 13/2462
340/572.1
(Continued)

FOREIGN PATENT DOCUMENTS

DE 102009040713 A1 3/2011
DE 102017209766 A1 12/2018
(Continued)

OTHER PUBLICATIONS

Hui Lin et al: "UWB, Multi-sensors and Wifi-Mesh based precision positioning for urban rail traffic", Ubiquitous Positioning Indoor Navigation and Location Based Service, Oct. 2010, pp. 1-8, XP031815187.
(Continued)

*Primary Examiner* — Nuzhat Pervin
(74) *Attorney, Agent, or Firm* — Laurence A. Greenberg; Werner H. Stemer; Ralph E. Locher

(57) ABSTRACT

A method for monitoring a danger area of a railway installation. At least one radio module is arranged in, or in the vicinity of, the danger area. Radio signals are transmitted by the radio module and the radio signals are received and evaluated. A pattern of the received radio signals in a basic state of the danger area is determined and when the radio signals are evaluated, differences from the pattern in the basic state are determined and a response is triggered when the differences exceed a predefined limit value. There is also described a monitoring device. The radio modules are preferably WLAN modules and the danger area is a tunnel. Timetabled breaches of the danger area by trains do not lead to an alarm and the radio modules are functionally tested by determining whether the predefined limit value is exceeded when a train travels through.

12 Claims, 2 Drawing Sheets

(58) Field of Classification Search
USPC .......................................................... 342/27
See application file for complete search history.

(56) References Cited

U.S. PATENT DOCUMENTS

| | | | | |
|---|---|---|---|---|
| 8,830,053 | B2* | 9/2014 | Benson | G07C 5/085 |
| | | | | 340/521 |
| 9,211,879 | B2* | 12/2015 | Leitel | B61L 25/028 |
| 11,247,706 | B2* | 2/2022 | Kafzan | B61L 15/0018 |
| 2016/0259037 | A1* | 9/2016 | Molchanov | G01S 7/0233 |
| 2016/0349365 | A1* | 12/2016 | Ling | G01S 13/42 |
| 2017/0310507 | A1* | 10/2017 | Bordes | G01S 7/0234 |
| 2018/0031697 | A1* | 2/2018 | Harris | G01S 7/023 |
| 2019/0101634 | A1* | 4/2019 | Baheti | G01S 7/415 |
| 2019/0137601 | A1* | 5/2019 | Driscoll | G01S 13/424 |
| 2020/0150260 | A1* | 5/2020 | Lang | G01S 13/42 |
| 2020/0166624 | A1* | 5/2020 | Gunther | G01S 13/04 |
| 2020/0174110 | A1* | 6/2020 | Carlson | G01S 7/411 |
| 2020/0182995 | A1* | 6/2020 | Zeng | G01S 13/003 |
| 2020/0191911 | A1* | 6/2020 | Meissner | G01S 13/343 |
| 2020/0191943 | A1* | 6/2020 | Wu | G01S 13/726 |
| 2021/0055404 | A1* | 2/2021 | Schoor | G01S 13/931 |
| 2021/0061327 | A1 | 3/2021 | Pelz et al. | |
| 2021/0070335 | A1* | 3/2021 | Bjurström | B61L 25/025 |
| 2021/0072346 | A1* | 3/2021 | Bogner | G01S 7/354 |
| 2022/0252697 | A1* | 8/2022 | Rennhard | G01V 3/12 |
| 2023/0022877 | A1* | 1/2023 | Schuster | B61L 25/025 |
| 2024/0025463 | A1* | 1/2024 | Ghaly | B61L 23/007 |
| 2024/0089022 | A1* | 3/2024 | Carlson | B61L 15/0027 |
| 2024/0132125 | A1* | 4/2024 | Carlson | B61L 27/04 |

FOREIGN PATENT DOCUMENTS

| | | | |
|---|---|---|---|
| DE | 102018200466 A1 | 7/2019 | |
| EP | 2947716 A1 * | 11/2015 | .............. G01S 7/03 |
| JP | 2001270442 A | 10/2001 | |
| WO | WO 2018224318 A1 | 12/2018 | |
| WO | WO 2019137798 A1 | 7/2019 | |

OTHER PUBLICATIONS

Halperin, Daniel et al.: "Tool Release: Gathering 802.11n Traces with Channel State Information", ACM SIGCOMM Computer Communication Review, vol. 41, No. 1, Jan. 2011, p. 53; 2011.

Fadel Adib and Dina Katabi: "See Through Walls with WiFi!", ACM SIGCOMM (2013).

Zhang, Jin et al.: "WiFi-ID: Human Identification using WiFi signal", 2016 International Conference on Distributed Computing in Sensor Systems (DCOSS), p. 75-82; 2016.

Hsieh, Chaur-Heh et al..: "Deep Learning-Based Indoor Localization Using Received Signal Strength and Channel State Information", IEEE Access(2019), vol. 7 p. 33256-33267; 2019.

Wang Tianjie et al: "WiFi positioning algorithm in tunnel based on Fuzzy C-means clustering and KNN algorithm",IEEE Chinese Automation Congress, Nov. 2019, p. 567-571, XP033711723.

Moustafa Youssef et al: "Challenges: Device-free Passive Localization for Wireless Environments", ACM International Conference On Mobile Computing and Networking, Sep. 2007, p. 222-229, XP058405854.

* cited by examiner

METHOD FOR MONITORING A DANGER AREA AND MONITORING DEVICE

FIELD AND BACKGROUND OF THE INVENTION

The invention relates to a method for monitoring a danger area of a railway installation, in which at least one radio module is arranged in the danger area or in the vicinity of the danger area, in which radio signals are transmitted by the radio module, and in which radio signals are received and evaluated by the radio module.

The invention also relates to a monitoring apparatus for a danger area with at least one radio module which can be arranged in the danger area and is designed to transmit and receive radio signals, and with at least one evaluation facility which is designed to evaluate the received radio signals.

In railway installations there are certain areas in which it must be ensured that they are free of obstacles or objects such as, for example, people. These areas may be referred to as danger areas and may be located, for example, in tunnels, on platforms, at level crossings or the like.

Of course, additional sensors such as, for example, radar scanners can be used to monitor these danger areas. However, this is very expensive. Cameras can also be used which, however, have the disadvantage that they usually have to be monitored by humans as AI algorithms are not yet sufficiently reliable and do not offer the necessary security.

Methods for monitoring a danger area of a level crossing are known from WO 2018/224318 A1 and WO 2019/137798 A1.

The use of radio modules is also known from the following publications:

Halperin, Daniel et al: "Tool Release: Gathering 802.11n Traces with Channel State Information"; ACM SIGCOMM CCR 41.1 (2011), page 53;

Hsieh, Chaur-Heh; Chen, Jen-Yang and Nien, Bo-Hong: "Deep Learning-Based Indoor Localization Using Received Signal Strength and Channel State Information", IEEE Access (2019);

Zhang, Jin et al: "WiFi-ID: Human Identification using WiFi signal", 2016 International Conference on Distributed Computing in Sensor Systems (2016).

SUMMARY OF THE INVENTION

The object of the present invention is to provide a method and an apparatus of the type mentioned at the outset which can be used in a cost-effective and automated manner.

The object is achieved according to the invention for the method mentioned at the outset in that a pattern of the received radio signals is determined in a basic state of the danger area and when the radio signals are evaluated, differences from the pattern in the basic state are determined and a response is triggered if the differences determined exceed a predefined limit value.

For the apparatus mentioned at the outset, the object according to the invention is achieved in that the evaluation facility is designed to determine at least one pattern of the received radio signals in a basic state of the danger area and to determine differences from the pattern in the basic state and to trigger a response if the differences determined exceed a predefined limit value.

The solution according to the invention has the advantage that existing radio modules such as, for example, WLAN modules of the railway installation can also be used for this purpose, and the evaluation of the radio signals can be taught in such a way that, for example, harmless obstacles permanently located in the danger area are not taken into account.

The solution according to the invention can be developed by advantageous embodiments which are described hereinafter.

Thus, after a triggered response, it can be checked whether there is a planned breach of the danger area. The planned breach can be triggered, for example, by a train traveling through the danger area, which of course represents a planned breach and is not intended to trigger any further response in the form of an alarm.

Furthermore, it is possible to check whether there is a planned breach of the danger area on the basis of a timetable of the railway installation. It is thus possible to check in a particularly simple manner whether the breach of the danger area is planned.

In order to be able to monitor the danger area as comprehensively as possible, a plurality of radio modules can be arranged and evaluated. The radio modules can either be arranged on the same side of the danger area or on opposite sides of the danger area. In the case of radio modules arranged opposite one another, at least one radio module can receive and evaluate such radio signals which it has not itself transmitted. This has the advantage that monitoring of the danger area is not dependent on reflected radio signals.

In a particularly advantageous embodiment, at least one WLAN router can be used as the radio module. This has the advantage that WLAN routers are often already available, for example in tunnels and in CBTC systems, and are otherwise also available at low cost.

In order to check a failure disclosure, in order to check the functionality of the at least one radio module, it is possible to monitor whether the limit value is exceeded in the event of a planned breach of the danger area. If this is not the case, a check would have to take place as an error can then be assumed.

In an advantageous embodiment of the monitoring apparatus according to the invention, this can be designed to carry out the method according to the invention according to one of the aforementioned embodiments.

The invention also relates to a railway installation which comprises a monitoring apparatus according to one of the aforementioned embodiments.

In one of the aforementioned developments of the railway installation according to the invention, the at least one radio module of the monitoring facility can be arranged in a tunnel of the railway installation and the tunnel forms the monitored danger area at least in sections. A tunnel represents a highly critical area, in particular in the public transport sector, where the tunnels are often very narrow, which in any case must be kept free of persons.

Furthermore, a computer program product with program commands for carrying out the aforementioned method according to the invention and/or its exemplary embodiments is claimed, it being possible to carry out the method according to the invention and/or its exemplary embodiments in each case by means of the computer program product.

In addition, a provisioning apparatus for storing and/or providing the computer program product is claimed. The provisioning apparatus is, for example, a data carrier which stores and/or provides the computer program product. Alternatively and/or additionally, the provisioning apparatus is, for example, a network service, a computer system, a server system, in particular a distributed computer system, a cloud-based computer system and/or a virtual computer system which preferably stores and/or provides the computer program product in the form of a data stream.

Provision takes place, for example, as a download in the form of a program data block and/or command data block, preferably as a file, in particular as a download file, or as a data stream, in particular as a download data stream, of the complete computer program product. However, this provision can also take place, for example, as a partial download which consists of a plurality of parts and, in particular, is downloaded via a peer-to-peer network or is provided as a data stream. Such a computer program product is read into a system, for example using the provisioning apparatus in the form of the data carrier, and executes the program commands, so that the method according to the invention is carried out on a computer.

The invention is explained in more detail hereinafter with regard to the attached drawings.

DETAILED DESCRIPTION OF THE INVENTION

Figure 1:
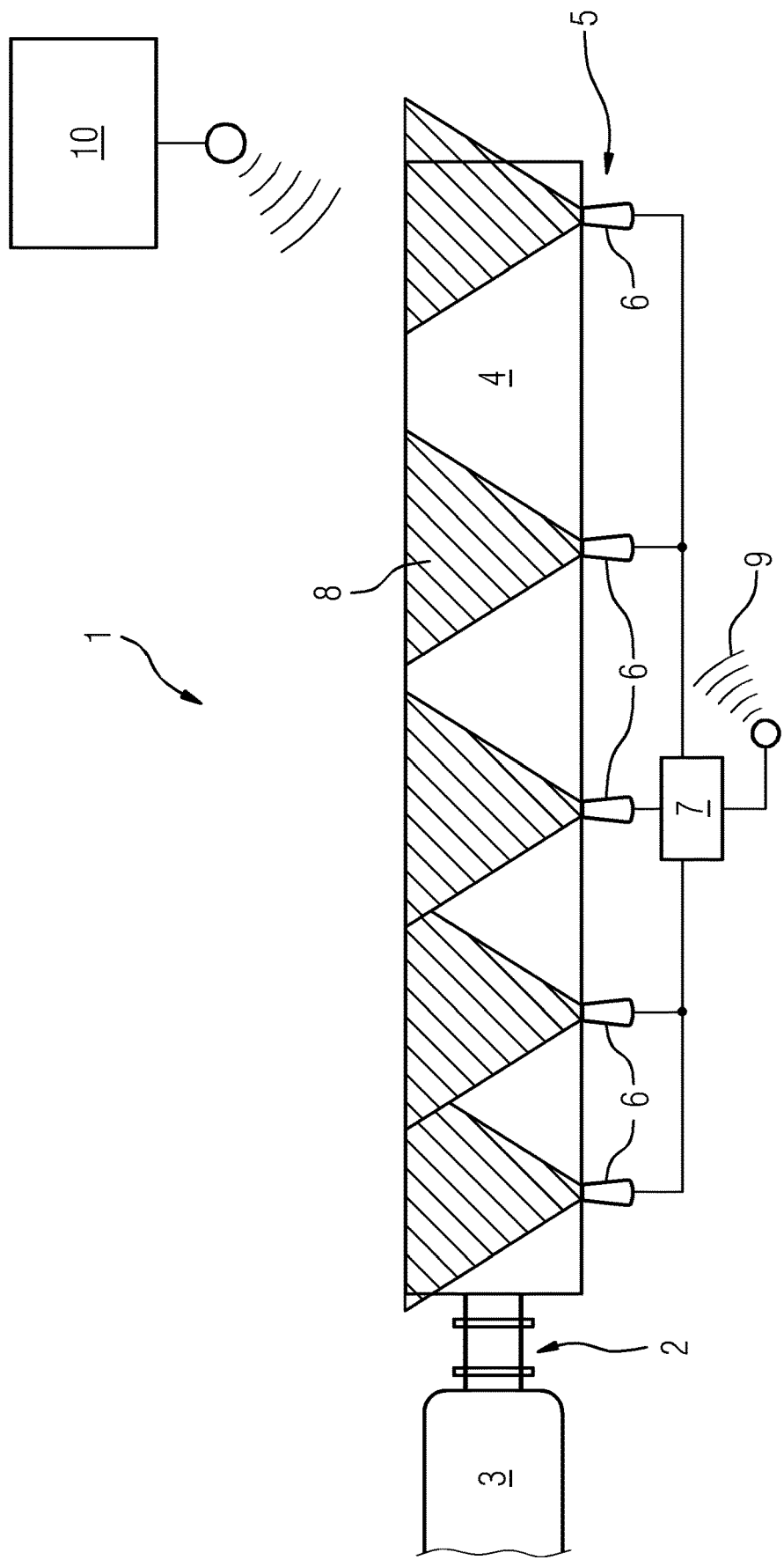
FIG. 1 A diagrammatic view of a first exemplary embodiment of a railway installation with a monitoring apparatus according to the invention.

First of all, the invention is explained with reference to the exemplary embodiment in FIG. 1. An exemplary embodiment of a railway installation 1 according to the invention comprises a route 2, a rail vehicle 3, a tunnel 4 and a monitoring apparatus 5. The monitoring apparatus 5 has a plurality of radio modules 6 and an evaluation facility 7 connected to the radio modules 6. In the exemplary embodiment in FIG. 1, the radio modules 6 are all WLAN routers. The monitoring apparatus 5 is designed to monitor a hatched danger area 8, which in the exemplary embodiment in FIG. 1 is located in the tunnel 4. With the monitoring apparatus 5, other danger areas of the railway installation 1 can also be monitored, such as, for example, level crossings or areas of platforms.

The radio modules 6, which are designed as WLAN routers, are arranged in the tunnel 4 and, during operation, transmit radio signals and also receive radio signals. The received radio signals can either originate from the radio module 6, which has also transmitted them, or else from other radio modules 6. The radio signals are advantageously reflected on the walls of the tunnel. The monitoring apparatus 5 according to the invention is therefore particularly suitable for monitoring danger areas located in closed spaces. The radio modules 6 each transmit a signal to the connected evaluation facility 7 which is representative of the received radio signals. During operation, the evaluation facility 7 evaluates the received radio signals from the radio modules 6.

When the monitoring apparatus 5 according to the invention is put into operation, a pattern of the received radio signals is determined in a basic state of the danger area 8. The evaluation facility 7 then determines differences from the pattern in the basic state. Such differences arise when an additional object, such as, for example, the rail vehicle 3 or a person, is located in the danger area 8 or travels through it. The evaluation facility 7 then triggers a planned response if the differences determined from the pattern in the basic state exceed a predefined limit value. In the exemplary embodiment in FIG. 1, this response is, for example, an alarm signal 9 which is determined at a control center 10 of the railway installation 1. In the control center 10, a check is then made as to how the alarm signal 9 is to be evaluated and how the operating sequence must be changed if necessary. For example, the control center 10 uses a timetable of the railway installation 1 to check whether the rail vehicle 3 should pass through the tunnel 4 as planned at the time of the alarm signal 9. If this is the case, there is an authorized breach of the danger area 8 and no additional measures need be taken in the operating sequence, for example.

Furthermore, the failure disclosure of the railway installation 1 can be checked in this case. At the scheduled time of the passage of the rail vehicle 3 through the tunnel 4, the alarm signal 9 must arrive at the control center 10 within a predetermined time window. If this does not occur, there may be a fault in the monitoring apparatus 5. In this case, for example, a check of the monitoring apparatus 5 and, if appropriate, a blocking of the tunnel 4 is initiated. According to the invention, a very simple failure disclosure is thus made possible by observing and evaluating the monitoring apparatus 5, taking into account the operating sequences in the danger area 8. This is carried out at the control center 10, which thus fulfills various reliability and safety requirements.

Special test messages or test signals which can be generated by the radio modules 6 and are suitable for the detection of objects in the danger area 8 can be used as radio signals of the radio modules 6.

For the monitoring apparatus 5 according to the invention, it is advantageous to use existing radio modules 6 which are, for example, part of an existing train protection facility of the railway installation 1. For example, radio modules 6 of known facilities such as Sitraffic EsCos RSU or the Airlink radio communication system can be used for this purpose, so that little or no additional hardware is required for the monitoring apparatus 5 according to the invention.

Of course, the monitoring apparatus 5 according to the invention can also monitor danger areas 8 other than the tunnel 4 in FIG. 1, such as, for example, tracks on platforms, operating areas or level crossings.

The tunnel 4 of the exemplary embodiment in FIG. 1 is particularly suitable for the monitoring apparatus 5 according to the invention because it represents an area which is essentially closed off from the environment and reflects the radio signals emitted by the radio modules 6. As a result of reflection, it is possible that, in the exemplary embodiment in FIG. 1, the radio modules 6 are arranged exclusively on the same side of the danger area 8.

The invention is explained below with regard to the exemplary embodiment in FIG. 2. For the sake of simplicity, only the differences from the embodiment in FIG. 1 will be discussed.

Figure 2:
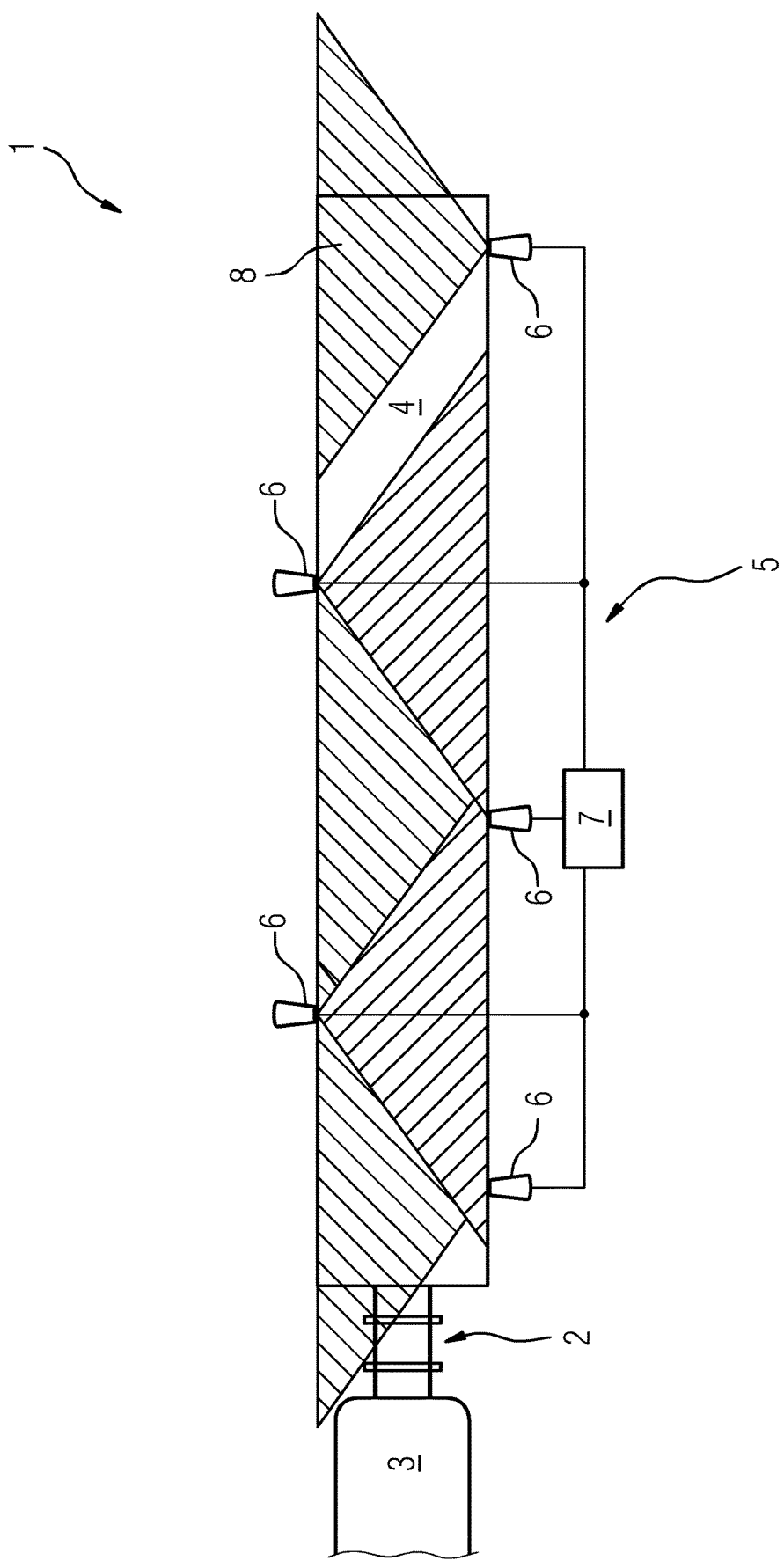
FIG. 2 A diagrammatic view of a second exemplary embodiment of a railway installation with a monitoring apparatus according to the invention.

Unlike the embodiment in FIG. 1, in the exemplary embodiment in FIG. 2, the radio modules 6 of the monitoring apparatus 5 are arranged on opposite sides of the danger area 8 or of the tunnel 4. This has the advantage that radio signals from opposite radio modules 6 can also be received. As a result, it is not necessary for the radio signals of the radio modules 6 to be reflected on the walls of the tunnel 4. In addition, however, this can of course also take place.

The invention claimed is:

1. A method of monitoring a danger area of a railway installation, the method comprising:
   providing at least one radio module in the danger area or in a vicinity of the danger area;

transmitting radio signals by the radio module;
receiving and evaluating radio signals by the radio module;
determining a pattern of the received radio signals in a basic state of the danger area;
evaluating the radio signals by determining differences from the pattern in the basic state and triggering a response when the differences exceed a predefined limit value; and
following the triggered response, checking whether there exists a planned breach of the danger area based on a timetable of the railway installation.

2. The method according to claim 1, which comprises providing and evaluating a plurality of radio modules.

3. The method according to claim 2, which comprises arranging the plurality of radio modules on the same side of the danger area.

4. The method according to claim 2, which comprises arranging the radio modules on opposite sides of the danger area.

5. The method according to claim 2, wherein at least one of the radio modules receives and evaluates radio signals which the at least one radio module has not transmitted itself.

6. The method according to claim 1, which comprises using at least one WLAN router as a radio module.

7. The method according to claim 1, which comprises checking a functionality of the at least one radio module by monitoring whether or not the limit value is exceeded in the event of a planned breach of the danger area.

8. A monitoring apparatus for a danger area of a railway installation, the monitoring apparatus comprising:
at least one radio module arranged in, or in a vicinity of, the danger area, said at least one radio module being configured to transmit and receive radio signals;
at least one evaluation facility configured to evaluate the radio signals received by said at least one radio module;
said at least one evaluation facility being configured to determine at least one pattern of the received radio signals in a basic state of the danger area, to determine differences from the at least one pattern in the basic state of the danger area, to trigger a response when the differences exceed a predefined limit value, and following the triggered response, to check whether there exists a planned breach of the danger area based on a timetable of the railway installation.

9. A railway installation, comprising a danger area and a monitoring apparatus, the monitoring apparatus including:
at least one radio module arranged in, or in a vicinity of, the danger area, said at least one radio module being configured to transmit and receive radio signals;
at least one evaluation facility configured to evaluate the radio signals received by said at least one radio module;
said at least one evaluation facility being configured to determine at least one pattern of the received radio signals in a basic state of the danger area, to determine differences from the at least one pattern in the basic state of the danger area, to trigger a response when the differences exceed a predefined limit value, and following the triggered response, to check whether there exists a planned breach of the danger area based on a timetable of the railway installation.

10. The configuration according to claim 9, wherein said least one radio module of said monitoring apparatus is arranged in a tunnel of the railway installation and the tunnel forms the monitored danger area at least in sections.

11. A computer program product, comprising program commands for carrying out the method according to claim 1.

12. A computer program carrier, comprising computer program code stored in non-transitory form, the computer program code being configured to carry out the method according to claim 1 when executed on a computer.

\* \* \* \* \*